July 2, 1946.   C. G. STRANDLUND   2,403,410
HITCH DEVICE
Filed June 13, 1944
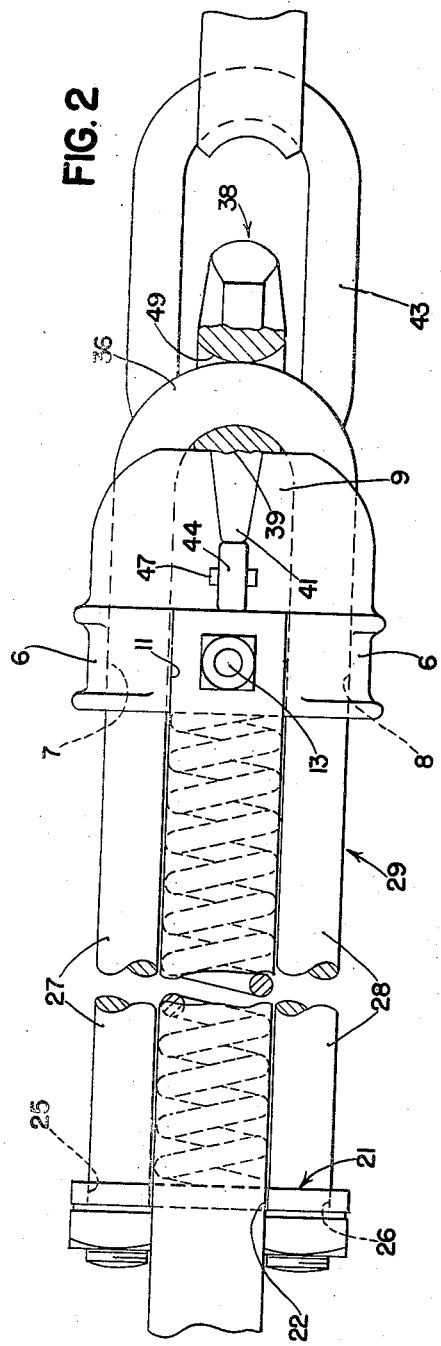
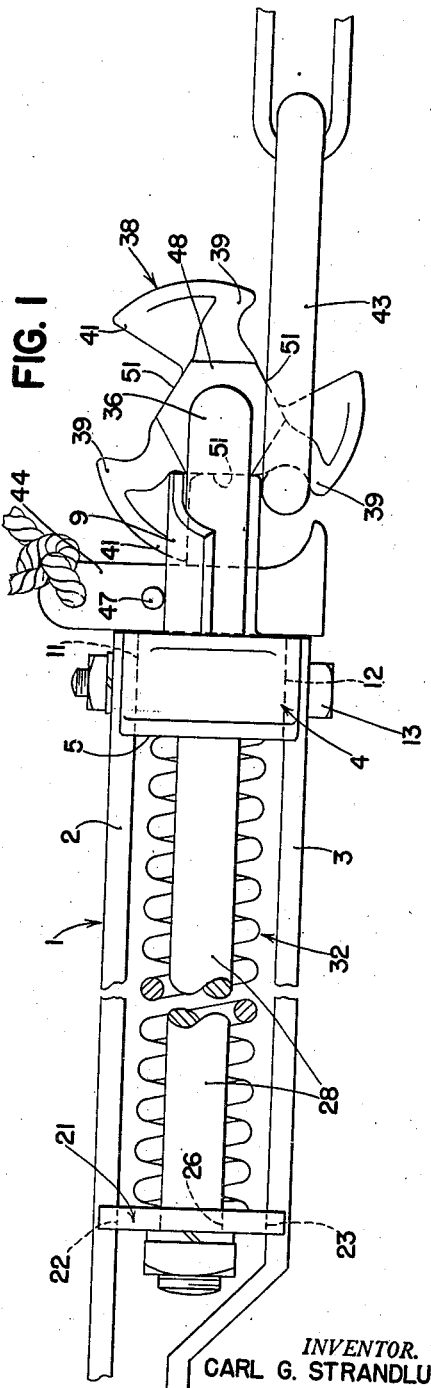
INVENTOR.
CARL G. STRANDLUND
BY
ATTORNEYS
WITNESS
E. B. Bjurstrom Patented July 2, 1946

2,403,410

UNITED STATES PATENT OFFICE 2,403,410

HITCH DEVICE

Carl G. Strandlund, Moline, Ill., assignor to Deere & Company, Moline, Ill., a corporation of Illinois Application June 13, 1944, Serial No. 540,098

2 Claims. (Cl. 280—33.16)

The present invention relates generally to releasable hitch devices, such as are usually used for coupling an agricultural implement to a propelling tractor. Particularly, the present invention is in the nature of an improvement over the spring cushioned releasable hitch devices shown in my prior United States Patents Nos. 2,271,748 and 2,334,889, dated, respectively, February 3, 1942 and November 23, 1943.

The object and general nature of the present invention is the provision of a coupling device of this kind which is materially cheaper to manufacture than coupling devices heretofore provided but which is strong and sturdy and fully as efficient as the heretofore provided more expensive designs. Particularly, it is a feature of this invention to provide, instead of a pair of springs to take the load, a single spring and to mount the same in position and hold the single spring in that position without extraneous parts, so that a single spring large enough to sustain the loads involved can be employed instead of a pair of lighter springs which normally are more expensive than a single spring affording the same power.

Another feature of the present invention is the provision of a U-shaped draft bolt upon which the rotatable coupling member is mounted, the intermediate portion or bight of the U-shaped draft bolt being arcuate and the associated rotatable coupling having an interior opening of substantially hourglass configuration so as to, first, fit against the rear part of the arcuate section of the draft bolt and, second, to be freely detachable therefrom. In certain devices heretofore provided, the rotatable coupling member was not detachable from the draft bolt, and hence when either of these parts broke or otherwise failed, the farmer was required to purchase a new assembly comprising both parts, but according to the present invention where one is detachable from the other, if either should fail, only that part need be replaced.

These and other objects and advantages of the present invention will be apparent to those skilled in the art after a consideration of the following detailed description, taken in conjunction with the accompanying drawing in which the preferred forms of the present invention have been illustrated.

In the drawing:

Figure 1 is a side elevation of a spring release hitch embodying the principles of my invention, certain parts thereof being broken away in order to better illustrate the construction.

Figure 2 is a plan view of the coupling device shown in Figure 1.

Referring now to the drawing, my improved hitch or coupling device is similar to that disclosed and claimed in my prior patents mentioned above, to which reference may be made if necessary. The coupling or spring cushion release hitch of the present invention embodies a frame 1 which includes a pair of vertically spaced longitudinally extending bars 2 and 3 which are spaced apart to receive therebetween an abutment member 4 in the form of a block or casting having a substantially flat rear or abutment face 5, a laterally extending flanged section 6 in which a pair of longitudinally extending openings 7 and 8 are formed and a generally forwardly extending section 9. The flange section 6 is provided with upper and lower notches 11 and 12 in which the forward ends of the bars 2 and 3 are disposed, and the bars 2 and 3 are apertured to receive an attaching bolt 13 that extends through the bars and also through an opening in the abutment member 4. Disposed between the rearward portions of the spaced apart bars 2 and 3 is a guide plate 21 having upper and lower notches 22 and 23 to receive the guide bars 2 and 3, whereby lateral displacement of the guide plate 21 is prevented while the guide plate is free for fore and aft movement in the frame 1. The ends of the guide plate 21 are apertured, as at 25 and 26, so as to receive the rear ends of the right and left legs or end portions 27 and 28 of a generally U-shaped draft bolt or plunger indicated in its entirety by the reference numeral 29. As best shown in Figure 2, the draft bolt sections 27 and 28 extend through the openings 7 and 8 in the abutment member 4. A heavy coil spring of the compression type, indicated by the reference numeral 32, is confined between the abutment block 4 at one end and at the other end the guide plate 21. The spring 32 is mounted between the upper and lower bars 2 and 3, and in order to prevent the spring from becoming displaced laterally, the leg extensions 27 and 28 of the draft bolt or plunger 29 are brought in alongside the frame bars 2 and 3 so as to form, in effect, a cage or retainer for maintaining the spring 22 in position between the abutment block 4 and the guide plate 21.

The forward portion of the U-shaped draft bolt or plunger 29 is formed as an arcuate section having an internal radius substantially equal to half the distance between the leg sections 27 and 28. This arcuate section is indicated by the reference numeral 36 and is disposed a short distance in advance of the front end of the abutment extension 9. Mounted for rotation on the arcuate section 36 is a rotatable hook member or coupling member 38 which is provided with three projections forming draft receiving hooks 39, and the rear portion of each hook section 39 is formed with an abutment section 41 that normally overlies the upper face of the abutment extension 9, as best shown in Figure 1. A connecting member in the form of a swivel 43 is normally engaged with one of the hook sections 39 and is carried by the propelling tractor or other source of pulling power. The connecting member 43 is held in place by a vertically shiftable detent 44 disposed in a slot 45 formed in the abutment member extension 9. The detent 44 is held in place by a stop pin 47.

The rotatable coupling member 38 has a hub 48, the central aperture 49 of which has an interior curvature of generally hourglass configuration so that, as best shown in Figure 2, it bears evenly against the rear surface of the arcuate section 36, thus providing a wide area of bearing contact between the rotatable coupling or hook member 38 and the draft bolt or plunger 29. When in normal position, as shown in Figure 1, any one of three faces 51 of the hub 48 is engaged with the forward end of the extension 9 of the abutment member 4 when the associated abutment section 41 rests against the upper face of the extension 9. The hub 48 and the central opening 49 thereof are dimensioned so that, when the draft member 29 is detached from the coupling device, the rotatable coupling member 38 may be removed therefrom merely by sliding the member 38 around on the arcuate section 36 and then along and off one or the other of the leg sections 27 or 28. In some previous designs of this type, the rotatable coupling member is not ordinarily detachable in this manner so that, in the event one or the other of the parts failed or became broken for any reason, it was necessary for the farmer to buy both parts new since they were assembled in the manufacturing operations, whereas, according to the present invention, these parts may be readily disconnected, as just described, and hence if one of them breaks it is necessary only to replace that one part.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A draft coupling device comprising a fore and aft extending frame, a U-shaped draft bolt formed of substantially round stock and disposed for longitudinal movement relative to said frame, spring means for resisting such movement of the draft bolt, the intermediate portion of the draft bolt being of generally arcuate formation, being arcuate about a center substantially midway between the sides of the draft bolt, and a coupling member rotatably mounted on the arcuate portion of said draft bolt, said coupling member having a central opening receiving the draft bolt, the interior surface of said coupling member being of generally hourglass configuration and presenting a curved surface formed by a generatrix which comprises a curved line arcuate about a center and having a radius substantially equal to the radius of curvature of the inner arcuate portion of said draft bolt, whereby said coupling member fits closely against the rear portion of the arcuate section of the draft bolt, the radius of the path of movement of said generatrix, in generating said curved surface, being movable about an axis that is spaced from said arcuate line a distance equal substantially to one half the diameter of said drive bolt, whereby said coupling member is removable from the draft bolt, as by sliding the coupling member around the arcuate portion of the draft bolt and then along one end portion of the latter.

2. The invention set forth in claim 1, further characterized by said fore and aft extending frame comprising a pair of longitudinally extending vertically spaced apart members and an abutment member at the forward end of said spaced apart members and having a pair of laterally spaced longitudinally extending apertures through which the sides of the draft bolt are slidable, a transverse plate member guidingly associated with said vertically spaced apart members and connected with the rear portions of the sides of said draft bolt, the arcuate portion of said draft bolt serving to space the sides thereof a distance apart sufficient to receive said spring means therebetween and said vertically spaced members being spaced a distance sufficient to receive said spring means therebetween, said spring means bearing at one end against said abutment member and at the other end against said transverse plate member.

CARL G. STRANDLUND.